F. COBEY.
CHUCK.
APPLICATION FILED MAR. 29, 1917.
1,304,659.
Patented May 27, 1919.
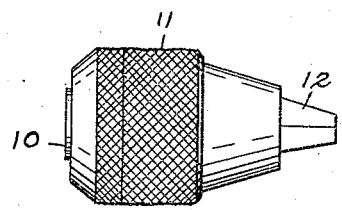
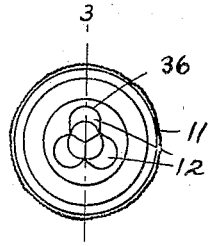
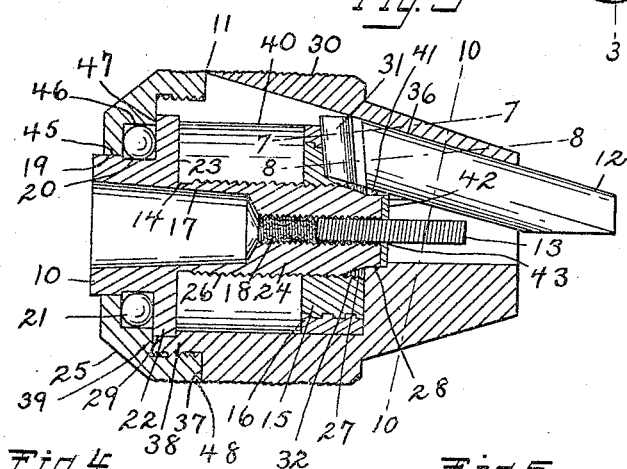
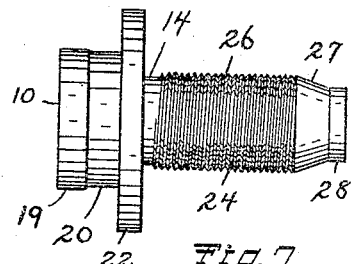
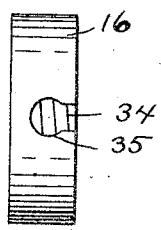
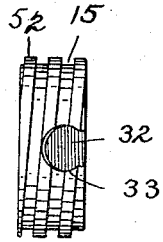
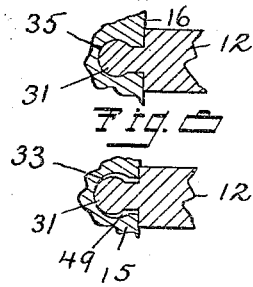
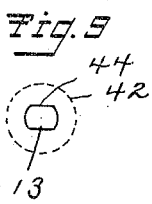
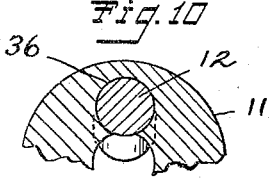
Inventor:
Frank Cobey.
By Louis M. Schmidt
Atty.

UNITED STATES PATENT OFFICE.

FRANK COBEY, OF EAST BERLIN, CONNECTICUT.

CHUCK.

1,304,659. Specification of Letters Patent. Patented May 27, 1919.

Application filed March 29, 1917. Serial No. 158,286.

*To all whom it may concern:*

Be it known that I, FRANK COBEY, a citizen of the United States, residing at East Berlin, in the county of Hartford and State of Connecticut, have invented certain new and useful Improvements in Chucks, of which the following is a specification.

My invention relates to improvements in chucks, and the object of my improvement is simplicity and economy in construction and convenience and efficiency in use and as pertaining to the feature of the backing or thrust screw shown and to be described the present application is an amplification of application Serial No. 28,170, filed May 14, 1915, and a companion to application Serial No. 158,285.

In the accompanying drawing:—

Figure 1 is a side elevation of my improved chuck.

Fig. 2 is an end elevation of the same.

Fig. 3 is a sectional view on an enlarged scale on the line 3—3 of Fig. 2.

Fig. 4 is a side elevation of the main part of the spindle member.

Fig. 5 is a similar view of the outer member of the carriage portion of the spindle member.

Fig. 6 is a similar view of the inner member of the same.

Fig. 7, is a sectional view on the line 7—7 of Fig. 3.

Fig. 8, is a sectional view on the line 8—8 of Fig. 3.

Fig. 9, is an end elevation of the thrust screw.

Fig. 10, is a sectional view on the line 10—10 of Fig. 3.

My improved chuck comprises a spindle member 10, a shell member 11, a set of jaws 12 operatively housed in the said members, and an axially positioned thrust screw 13, the said spindle member and shell member being each built up of a plurality of parts.

The spindle member 10 comprises a main part 14 and a carriage supported thereby composed of an inner part 15 and an outer part 16.

The main part 14 has a bore composed of a socket portion 17 at the inner end that is in the form of a tapered socket to fit the correspondingly tapered end of a spindle, and a threaded portion 18 of relatively small diameter at the outer end that is operatively engaged with the thrust screw 13.

On the exterior the main part 14 comprises a cylindrical portion 19 at the inner end, a slightly reduced portion 20 next to the same that serves as a raceway for a set of balls 21, an annular flange 22 at the outer end of the raceway 20 that serves as a thrust bearing for the balls 21, the outer face 23 of the flange 22 being extended inwardly radially appreciably, and there extends outwardly from the said face 23 a reduced extension or stem 24. The cylindrical portion 19 serves as a bearing for the rear part 25 of the shell member 11.

The stem 24 is of appreciable length, has a cylindrical, threaded periphery 26 for the major part of the length, and has adjacent the outer end a short conical periphery 27 that merges into a short cylindrical portion 28 at the extreme outer end.

The periphery 29 of the flange 22 is cylindrical and serves as a rear bearing for the front part 30 of the shell member 11 and the reduced cylindrical end portion 28 of the stem 24 serves as the outer bearing for the same.

The parts 15 and 16 that compose the carriage are each of annular form and of about the same length and are appreciably shorter than the threaded portion 26 of the stem 24, suitably to travel along the same, the said parts being superimposed the one on the other and each having a set of keyhole slots for receiving the cross-ribs 31 on the rear ends of the jaws 12. The inner part 15 has a threaded inner wall 32 that is an operative fit for the thread 26 on the stem 24, is provided with a relatively coarse thread 52 on the periphery, and has the keyhole slots 33 for the ribs 31, there being three slots 33 to correspond with the number of jaws 12.

The outer part 16 has a cylindrical periphery, has an interior coarse thread 34 to fit the thread 32 on the inner part 15, and has a set of slots 35 for the ribs 31.

The jaws 12 are of cylindrical form generally, fitting in longitudinal, inclined slots 36 in the front part 30.

The cross-ribs 31 are positioned generally radially, and in some cases may be made so, though I prefer, as shown, to position the same at a slight inclination from the radius, the keyhole slots 33 and 35 being correspondingly inclined, as in this manner the ribs 31 may be made longer with a given diameter of the jaws 12 and a more firm clamping is effected by the jaws.

The key-hole slots 35 in the outer part 16 are made a good fit for the cross-ribs 31 so that these parts are always in close engagement, and the key-hole slots 33 in the inner part 15 are made an appreciably loose fit for the said ribs 31, whereby a limited relation rotative movement is permitted of the outer part 16 on the inner part 15 in coöperation with the coarse thread engagement of these parts by means of the threads 34 and 32.

The shell member 11 is composed of the rear part 25 and the front part 30.

The front part 30 extends over the spindle member 10 from the front end rearwardly as far as the rear face of the flange 22, has the slots 36 for the jaws 12, has an annular shoulder 37 adjacent the rear end, and a reduced neck 38 extending rearwardly from the said shoulder 37 that is threaded on the periphery 38.

On the interior the front part 30 has a bore composed of a cylindrical portion 39 that bears against the periphery 29 of the flange 22, a slightly reduced main portion 40 that extends over the stem 24 and fits over the carriage, has a cylindrical bearing portion 41 that engages with the end bearing 28 on the stem 24, and outwardly from the bearing portion 40 and opposed to the end face of the stem 24 is provided with a washer 42 that is forced in place and has a non-circular hole 43 that is a fit for the thrust screw 13.

As shown, the thrust screw 13 has flat sides 44 in opposite sides, and is driven by the washer 42.

The utilization of the washer 42 for driving the thrust screw 13 is a construction feature and in lieu thereof there may be provided an integral web having the hole 43.

The rear part 25 serves as a closure for the shell member and has a bore composed of the cylindrical portion 45, an enlargement 46 that fits over the balls 21, has a shoulder 47 that bears against the rear face of the flange 22 and also against the end of the neck 38 of the front part 30 and has at the front end an overhanging annular portion 48 that extends over the said neck 38 and has threaded engagement therewith.

In use, as the shell member is rotated relatively to the spindle member the jaws are moved to and fro in the longitudinal slots or ways by reason of the engagement of the carriage with the jaws and also with the stem of the main part of the spindle member, the carriage serving as the connecting means between the jaws and the spindle, and the thrust screw is simultaneously moved axially to and fro.

By having the carriage composed of two parts as described, with the parts engaged by means of the coarse thread, a means is provided for effecting a quick release of the jaws. Furthermore, by having both parts of the carriage provided with ways for engaging with the jaws both parts of the carriage are rotated with the jaws and by providing for a loose fit for the jaws and the ways in one of the said parts as described a means is provided for limiting the relative travel of the said parts along the said coarse thread. Thus means are provided for limiting the quick release effect without the provision of a special stop or lug on one part and a corresponding recess on the other part.

In the sectional view shown in Fig. 7 the cross-rib 31 of the jaw 12 is shown to be a good fit for the way 35 in the outer part 16 of the carriage with which it is engaged.

Fig. 8 corresponds generally to Fig. 7 with the section taken across the inner part 15 instead of the outer part 16. In this view the cross rib 31 is shown as a loose fit in the way 33, there being clearance 49 between the opposed walls.

The coarse thread portions of the two coöperating parts of the carriage operate as helical end cam members and in lieu thereof some other form of end cam construction may be used.

I claim as my invention:—

1. A chuck comprising a spindle member having an annular bearing flange, a shell member inclosing the said spindle member, a set of jaws operatively housed in the said members, the said shell member being composed of two parts only that are joined together adjacent the said flange by coöperating threaded portions, and the said two parts having coöperating annular shoulders for limiting the movement of the threaded portions in connecting the two parts together.

2. In a chuck comprising a spindle member, a shell member, and a set of jaws operatively housed in the said members, and the said jaws being of elongated form and each having at the inner end a cross-rib that serves as the means of connection with the said spindle member and the said cross-rib being directed at an angle to the radial line of the said jaws.

3. In a chuck comprising a spindle member, a shell member, and a set of jaws operatively housed in the said members, the said jaws being generally of cylindrical form and each having at the inner end a cross-rib that serves as the means of connection with the said spindle member, and the said cross-ribs being positioned in angular relation to the radius.

4. A chuck comprising a spindle member, a shell member, and a set of jaws operatively housed in the said members, the said spindle member comprising a main part having a threaded stem at the front end, and a carriage operatively mounted on the said stem, the said carriage being composed of an inner part engaged with the said stem and an outer part engaged with the said inner part by means of a relatively coarse thread, and both of the said parts having generally radial ways for engaging with the ends of the said jaws.

5. A chuck comprising a spindle member, a shell member, and a set of jaws operatively housed in the said members, the said spindle member comprising a main part having a threaded stem at the front end, and a carriage operatively mounted on the said stem, the said carriage being composed of an inner part engaged with the said stem and an outer part engaged with the said inner part by means of a relatively coarse thread, both of the said parts having generally radial ways for engaging with the ends of the said jaws, and the said parts being of annular form, and being of substantially the same length.

6. A chuck comprising a spindle member, a shell member, and a set of jaws operatively housed in the said members, the said spindle member comprising a main part having a threaded stem at the front end, and a carriage operatively mounted on the said stem, the said carriage being composed of an inner part engaged with the said stem and an outer part engaged with the said inner part by means of a relatively coarse thread, both of the said parts having generally radial ways for engaging with the ends of the said jaws, and means for limiting the relative travel of the said parts along the said coarse thread.

7. A chuck comprising a spindle member, a shell member, and a set of jaws operatively housed in the said members, the said spindle member comprising a main part having a threaded stem at the front end, and a carriage operatively mounted on the said stem, the said carriage being composed of an inner part engaged with the said stem and an outer part engaged with the said inner part by means of a relatively coarse thread, both of the said parts having generally radial ways for engaging with the ends of the said jaws, the said jaws having cross-ribs at the inner ends, the said parts both having ways for engaging with all of the said cross-ribs, and the ways in one of the said parts being a close fit for the cross-ribs with which they are engaged and the ways in the other of the said parts being a loose fit for the same.

8. In a chuck having means for effecting a quick release of the jaws comprising a carriage composed of two parts rotatively and slidably mounted one on the other, having opposed helical end cam portions, and provided with means for limiting the relative rotative movements of the said parts, and both of the said parts having means for engaging directly with the jaws.

FRANK COBEY.

Witnesses:
 HAROLD R. JONES,
 ALFRED L. THOMPSON.

Copies of this patent may be obtained for five cents each, by addressing the "Commissioner of Patents, Washington, D. C."